(12) United States Patent
Li

(10) Patent No.: US 6,225,977 B1
(45) Date of Patent: May 1, 2001

(54) HUMAN BALANCE DRIVEN JOYSTICK

(76) Inventor: John Li, One Ocean Dr., Jupiter, FL (US) 33469

( * ) Notice: Subject to any disclaimer, the term of this patent is extended or adjusted under 35 U.S.C. 154(b) by 0 days.

(21) Appl. No.: 09/238,987

(22) Filed: Jan. 28, 1999

Related U.S. Application Data

(63) Continuation-in-part of application No. 08/824,011, filed on Mar. 25, 1997, now abandoned.

(51) Int. Cl.[7] ....................................................... G09G 5/00
(52) U.S. Cl. .............................. 345/156; 345/167; 463/36
(58) Field of Search ..................................... 345/156, 157, 345/167, 163, 161, 173; 463/36, 37, 38, 30

(56) References Cited

U.S. PATENT DOCUMENTS

| | | | |
|---|---|---|---|
| 4,817,950 | * | 4/1989 | Goo ................................. 273/148 B |
| 4,906,192 | * | 3/1990 | Smithard et al. .................... 434/253 |
| 5,613,690 | * | 3/1997 | McShane et al. ......................... 428/8 |
| 5,860,861 | * | 1/1999 | Lipps et al. ............................ 463/36 |

FOREIGN PATENT DOCUMENTS

2038597  *  7/1980  (GB) .

OTHER PUBLICATIONS

IBM Technical Disclosure Bulletin vol. 28 No. 11, Apr. 1986.*

* cited by examiner

*Primary Examiner*—Dennis-Doon Chow
(74) *Attorney, Agent, or Firm*—McHale & Slavin

(57) ABSTRACT

A method and apparatus for driving a computerized cursor through the translation of weight shifts of the human body. A force detection platform that detects small shifts in the center of gravity of the subject, electronically digitizes this information and then converts it to an analogue signal. This analogue signal is then fed into the generic joystick port of any personal computer and can be used to drive any existing software that incorporates use of a standard joystick.

19 Claims, 10 Drawing Sheets

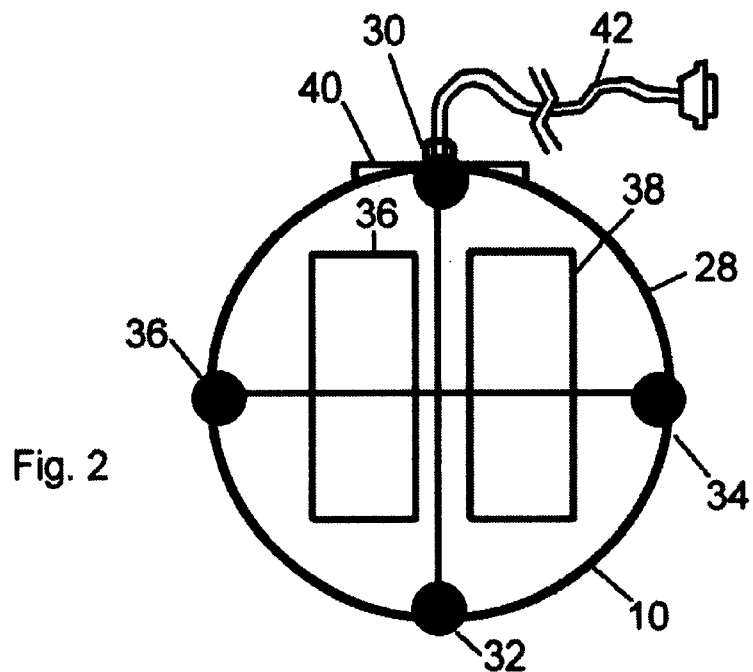
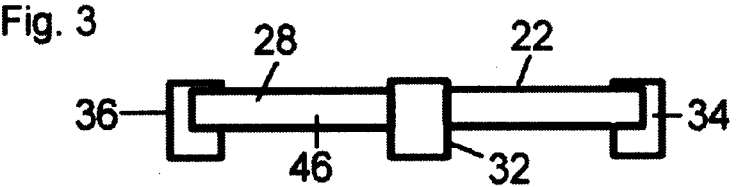
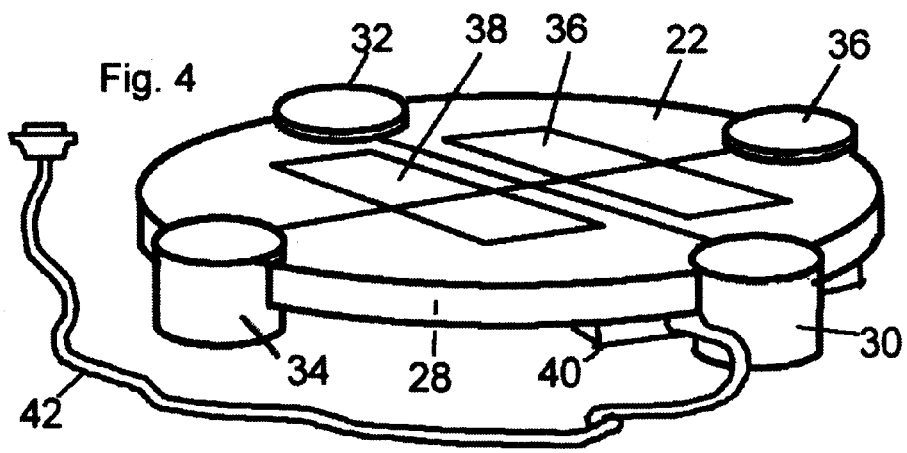

HUMAN BALANCE DRIVEN JOYSTICK

This application is a continuation in part of a parent U.S. patent application having the Ser. No. 08/824,011 filed Mar. 25, 1997 abandoned, the contents of which are incorporated by reference. The parent application is hereby expressly abandoned.

SUMMARY OF THE INVENTION

This invention relates to the field of computer peripherals and, more particularly, to a joystick controller that controls by detecting weight shifts of a subject's center of gravity away from a center point.

BACKGROUND OF THE INVENTION

Computer axis control has been performed by the use of joysticks for many years. Joysticks are used to control various devices including cranes, wheelchairs, airplanes, computer games, and so forth. Most such joysticks are controlled by hand movement in light of the hand providing precise fine motor capabilities. Some joysticks are controlled with other parts of the body, such as the feet for rudder pedals/accelerator pedals. Head/chin/mouth joysticks are available for quadriplegics. These joysticks exist by default because the hand is either busy, reserved, or unable to perform the required tasks.

With the advent of more advanced computers and associated computer simulations, it is found that the hand is not necessarily the best actuator for all joystick movements. While conceding that most applications are well served with manual controls, there are now applications may not be. For instance, when participating in balance-intensive sports such as skiing, surfing, and skating, one maintains this balance with subtle weight shifts through movements of the body. When using a computerized simulator for these sports, it would seem to follow that control actuation should be accomplished through similar means.

It is in fact awkward and infinitely less-realistic, in the midst of intense simulation, to estimate the amount of joystick deflection that would correspond to the proper amount of torso tilt required to prevent a fall and then send that message to the hand muscles to carry out the motion.

One known device is manufactured by Neurocom International which is sold under the mark "Balance Master". Essentially, the device is a computerized system for use by medical technicians in measuring the location of a person's center of gravity and plotting it on a computer screen. A patient stands on a step plate while a computer screen registers an icon. As the patient moves forward and to the right, the icon moves up and to the right proportionately to the actual movements. This device is used in medical applications to measure the amount of sway in patients with inner ear and balance disorders, providing diagnostic and therapeutic applications based on the amount of imbalance. Preponderance of sway to a given direction and pattern may indicate the sidedness of a stroke or inner ear problem. A patient who sways too much might practice holding the icon on the screen still. However, the Balance Master device fails to teach a gravity-based joystick for use in computer game operation or a means for monitoring rotation about the Z-axis.

Other known devices relate to a form of cursor control but fail to teach a device that creates a human joystick. For instance, U.S. Pat. No. 4,450,530 discloses a computer controlled sensory coordinator which has multiple sensory elements and executor output elements which is modeled after studies on brain functions for understanding the concept of the coordination.

U.S. Pat. No. 5,052,406 discloses a device for coordination analysis incorporating a force sensing device. Support surfaces are configured to move in a functional relation to the subject's placement.

U.S. Pat. No. 5,086,785 discloses an angular displacement sensor which allows measurements and angular positioning versus the typical xy axis.

U.S. Pat. No. 5,178,160 discloses a device to assist in the rehabilitation in measurement of musculoskeletal functions and is detailed in its use of one or more strain gauges allowing for the evaluation and measurement of the musculoskeletal performance of the patient with a particular emphasis directed to the back of the patient.

U.S. Pat. No. 5,367,315 discloses a foot-operated cursor controller for use with computers.

U.S. Pat. No. 5,476,103 discloses foot plates having sensing elements that are coupled to a force plate providing feedback of movement coordination, strain and speed skills, and performed in combination on various surfaces.

Thus what is lacking in the art is a device that actuates computer simulations using the weight shifting and dynamic sway and monitors rotation about the Z-axis, effectively creating a human joystick.

SUMMARY OF THE INVENTION

A method and apparatus for driving a computerized cursor through the translation of weight shifts of the human body. The apparatus employs a force detection platform to detect small shifts in the center of gravity of the individual standing on the platform and electronically digitizes this information to convert it to an analog signal. This analog signal is then fed into the generic joystick port of a personal computer and can be used to drive any existing software that incorporates use of a standard joystick. The apparatus creates an efficient and realistic mode of control for certain simulation applications.

It is an object of the current invention to disclose a device that actuates computer simulations using the weight shifting and dynamic sway. These simulations may include, but are not limited to any of the following activities: children's games, adult games, windsurfing, surfing, snowboarding, skating tutorials, ski training, golf stance training, and so forth.

Another object of the current invention is to disclose a device for coupling to a standard joystick port. Not only is the device unique in its ability to interface with standard PC joystick port, a secondary joystick port can be utilized. The design incorporates a secondary "pass through" joystick port that allows the use of the multi-directional hat-switch, 4 analog switches, rudder and throttle controls of any commercially available joystick that is attached to the force plate via this port. A separate switch on the force plate unit will allow convenient selection between force-plate versus hand-held unit for X–Y axis control.

Still another object of the current invention is to disclose a device for producing analog signals.

Yet still another object of the current invention is to disclose a device to measure rotation about the Z-axis.

An additional object of the current invention is to provide an input device having a hand-held extension that allows "hat switch" and 4 analog button functions.

It is also an object of the present invention to provide a weight driven input device that is portable.

It is yet another object of the present invention to provide a weight driven input device that allows a variety of interface options including, but not limited to, snowboards, skateboards, and wheelchairs. These options do not require any special attachment hardware or bindings, however such hardware may be used, if desired.

It is a further object of the present invention to provide a weight driven input device that accepts input from subjects who are laying down or sitting.

It is still another object of the present invention to provide a weight driven input device that includes discrete output-providing plates which may be selectively oriented to produce customized output responses for a given type of input signal.

It is also an object of the present invention to provide a weight driven input device that includes discrete input-sensing plates which may be selectively oriented to adjustably modify the resultant input signal produced by a given type of input motion.

It is a further object of the present invention to provide a weight driven input device having strain gauges positioned so that weight shifts will be accurately registered by a subject positioned at a variety of locations on an included input plate.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

FIG. 2 is a top view of the joystick platform;

FIG. 3 is a side view of FIG. 2;

FIG. 4 is a perspective view of FIG. 2;

DETAILED DESCRIPTION OF THE DEVICE

Although the invention will be described in terms of a specific embodiment, it will be readily apparent to those skilled in this art that various modifications, rearrangements and substitutions can be made without departing from the spirit of the invention. The scope of the invention is defined by the claims appended hereto.

Figure 1:
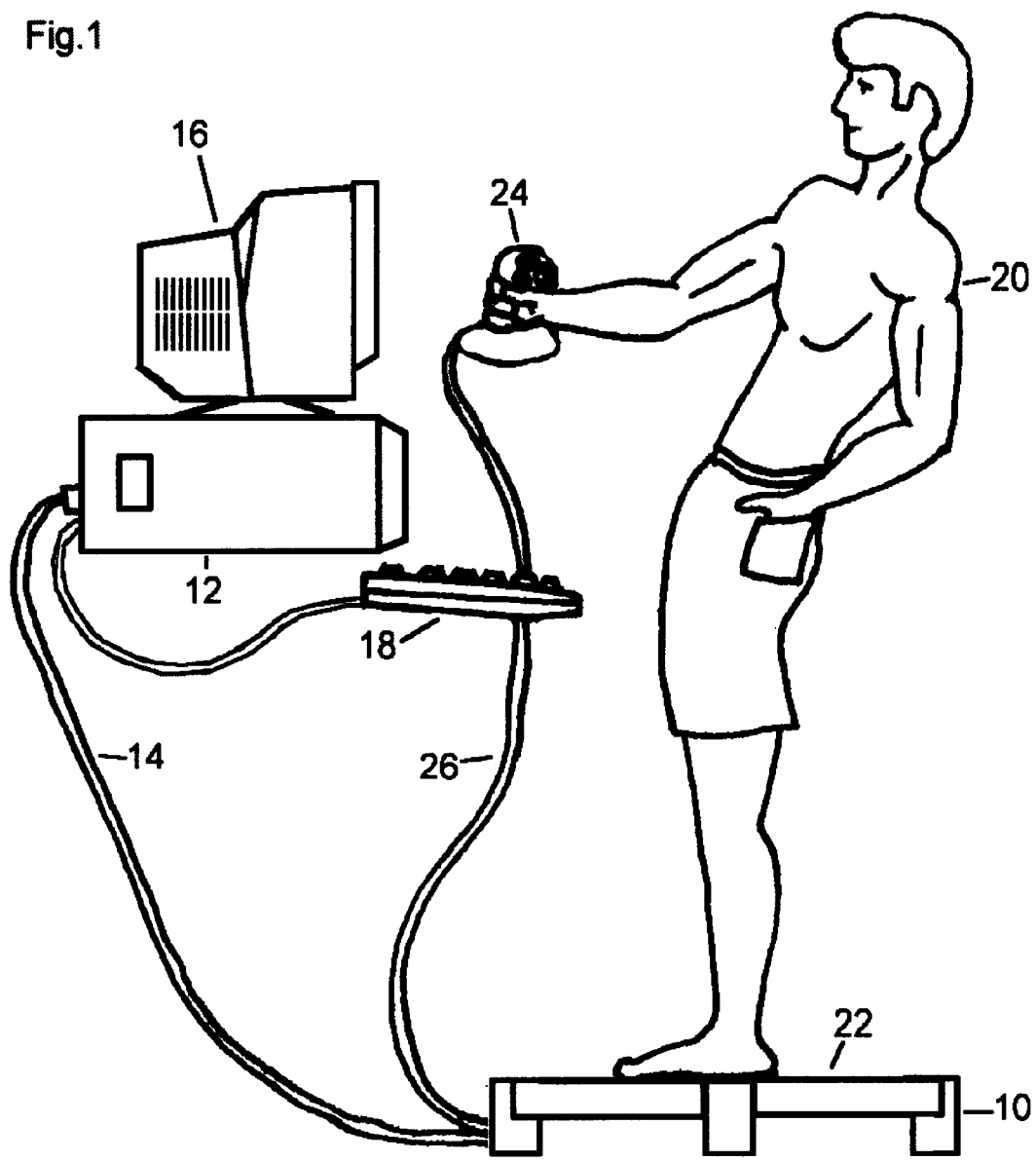
FIG. 1 is a pictorial of the components of having an individual operating the joystick.

FIG. 1 illustrates the controller platform device 10 and its interface with a computer 12 by cable 14. The computer 12 has a monitor 16 and keyboard 18. In accordance with the invention, the device 10 is placed on a floor, or other firm flat surface, in front of the computer 12. An individual 20 stands on the upper surface of the device 10 and controls the movements of a software application icon with his own body movements. The device includes strain gauges, as described in more detail later in this specification. Each gauge measures the amount of pressure applied in relation to surrounding gauges to determine the amount of icon movement necessary. The device 10 further allows the use of a secondary hand held joystick device 24 that is plugged into the device 10 by cable 26 for enhancing or simulating cursor movement.

FIG. 2 is a top view of the platform device 10 which consists of a round forceplate platform 28 supported by forward strain gauge 30, aft strain gauge 32, first side strain gauge 34, and second side strain gauge 34. Sections 36 and 38 highlight the preferred area for an individual to stand during operation of the platform. A conversion box 40 is mounted to the platform for converting strain gauge data to an analog scale for joystick output cord 42.

FIG. 3 is a side view of FIG. 2 illustrating the upper surface 22 of the platform 10 with strain gauges 30, 32, 34, and 36 formed integral to legs to position the platform structure 28 a distance above the floor. The lower surface 46 of the platform is shown raised above each of the leg bottom surfaces allowing the platform 10 to be used on irregular surfaces to inhibit movement of the platform.

FIG. 4 is a perspective view of the platform device 10 illustrating forceplate platform 28 supported in the raised position by leg/strain gauge structure 30, aft strain gauge 32, first side strain gauge 34, and second side strain gauge 34. Sections 36 and 38 highlight one possible area for an individual to stand during operation of the platform. Although a preferred foot placement area 36,38 are indicated on the surface of the forceplate platform 28, these are only visual cues. The perimeter-based arrangement of the strain gauges allows an individual's weight shifts to register accurately, regardless of foot position. This allows the present invention to work correctly with a number of interfaces. Although not shown, these interfaces could include bindings for skis or snowboards. Surfboard and windsurfer mockups, not shown, could also be used. It is noted that although the forceplate platform 28 may be fitted with special interface hardware, such hardware is not necessary. Equipment may be placed directly on the forceplate, if desired, or not used at all. The forceplate platform 28 may even be sized to support a wheelchair, thereby allowing use by wheelchair-bound individuals. Moreover, individuals may sit or lay on the forceplate 28 during use. In short, the forceplate 28 will accommodate a wide variety of input arrangements.

Figure 5:
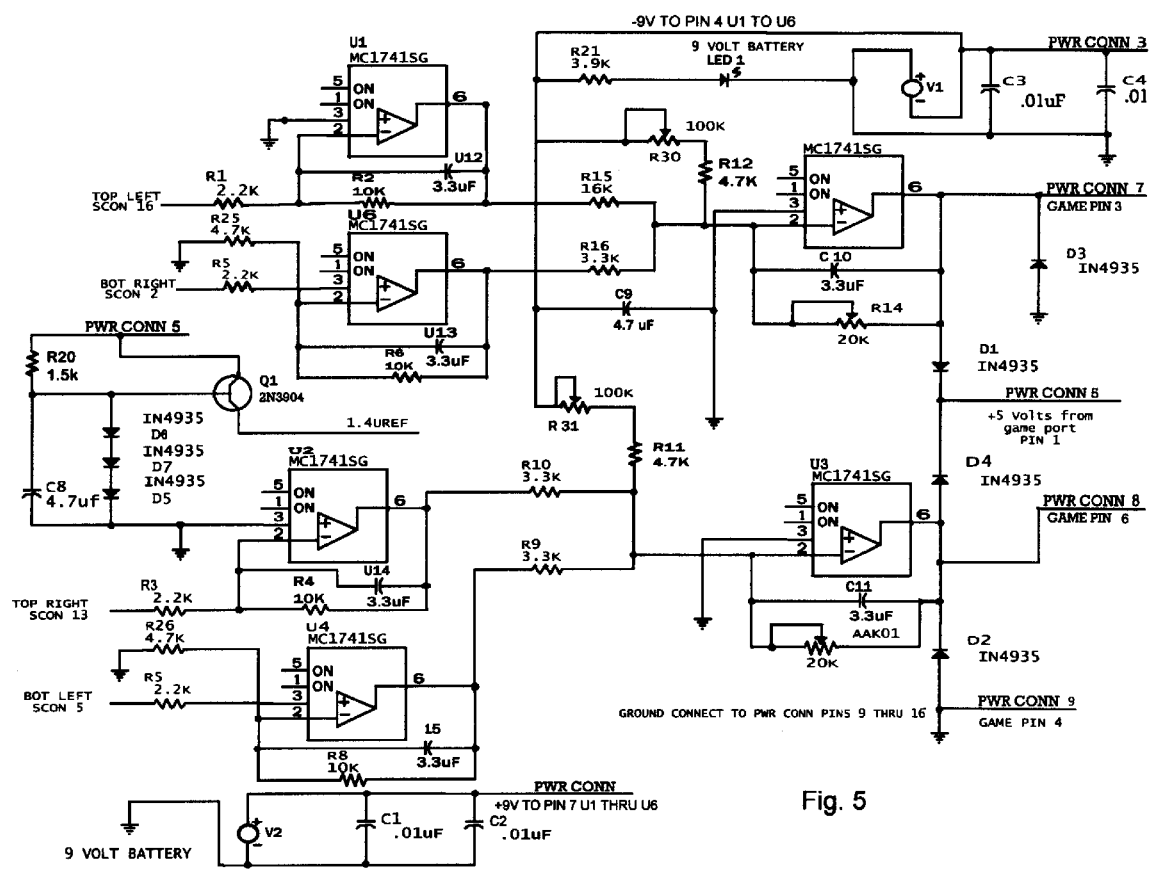
FIG. 5 is an electrical schematic of the device.

FIG. 5 depicts the electrical schematic for the controller. The controller employs a locally mounted battery or external power to supply power to the strain gauges for resistance measurement. The resistance of the strain gauge increasing with the weight of the individual positioned over, or leaning toward, one of the strain gauges.

Figure 6:
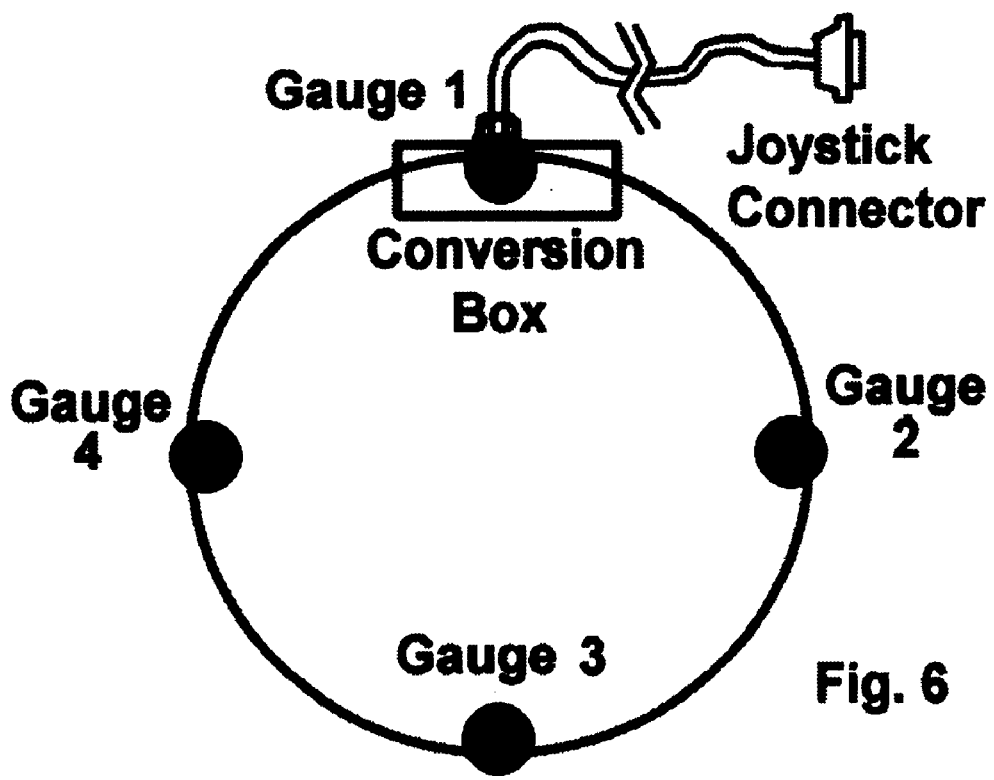
FIG. 6 is pictorial of the strain gauge positioning.
Figure 7:
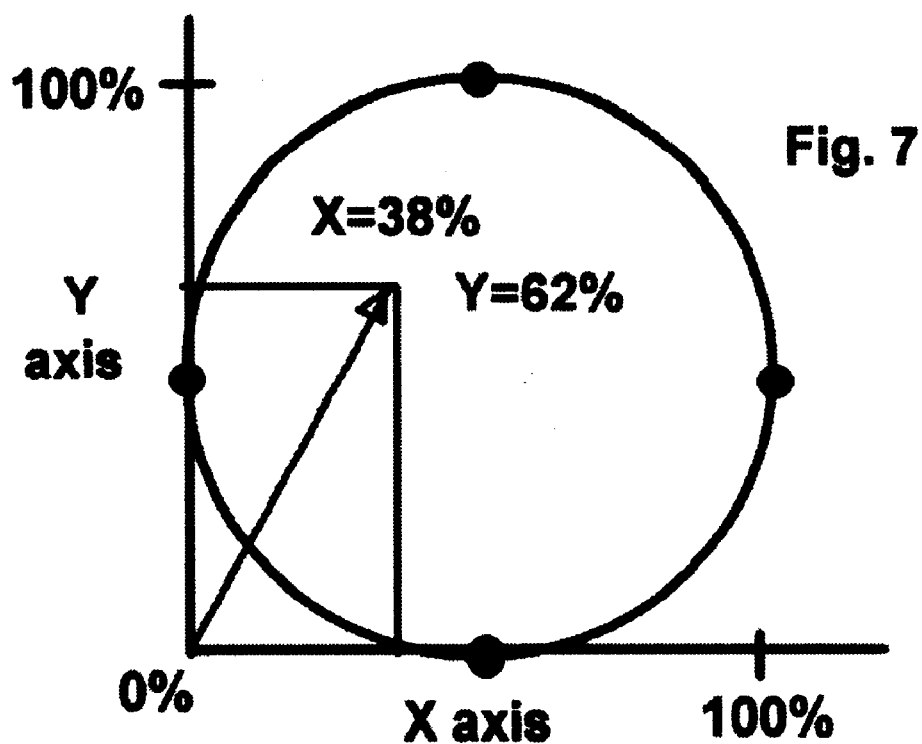
FIG. 7 is a graph depicting the Y and X axis strain gauge operation.

FIGS. 6 and 7 show conceptually how the device works. Gauges 1 and 3 measure displacement along the Y axis, and are wired together independently of gauges 2 and 4. Gauges 2 and 4 measure displacement along the X axis, and are wired together independently of gauges 1 and 3. Considering the Y axis, if the weight is evenly distributed between the 2 points, then the center of gravity (COG) is in the middle—or at the 50% mark of the distance between gauge 3 (as the reference point) and gauge 1 (maximal 100% displacement). If all the weight were on gauge 1, then the reading would reflect 100% displacement of the distance between gauge 3 and gauge 1.

Mathematically this is expressed as follows:

Gauge 1 weight reading×100%=percent deviation on Y axis–Gauge 1+Gauge 3

Gauge 2 weight reading×100% percent deviation on X axis–Gauge 2+Gauge 4

This formula is calculated at the conversion box and then "zeroed" at 50% for the joystick output. Since joysticks have positive and negative deflections, the 50% displacement on both the X and Y axis is the equivalent of the joystick's 0%,0% centering mark.

Example: If a 200-pound subject leans forward and to his left such that his weight is distributed as follows: gauge #1=62 lb.; gauge #2=38 lb.; gauge #3=38 lb.; Gauge #4=62 lb.

Figure 8:
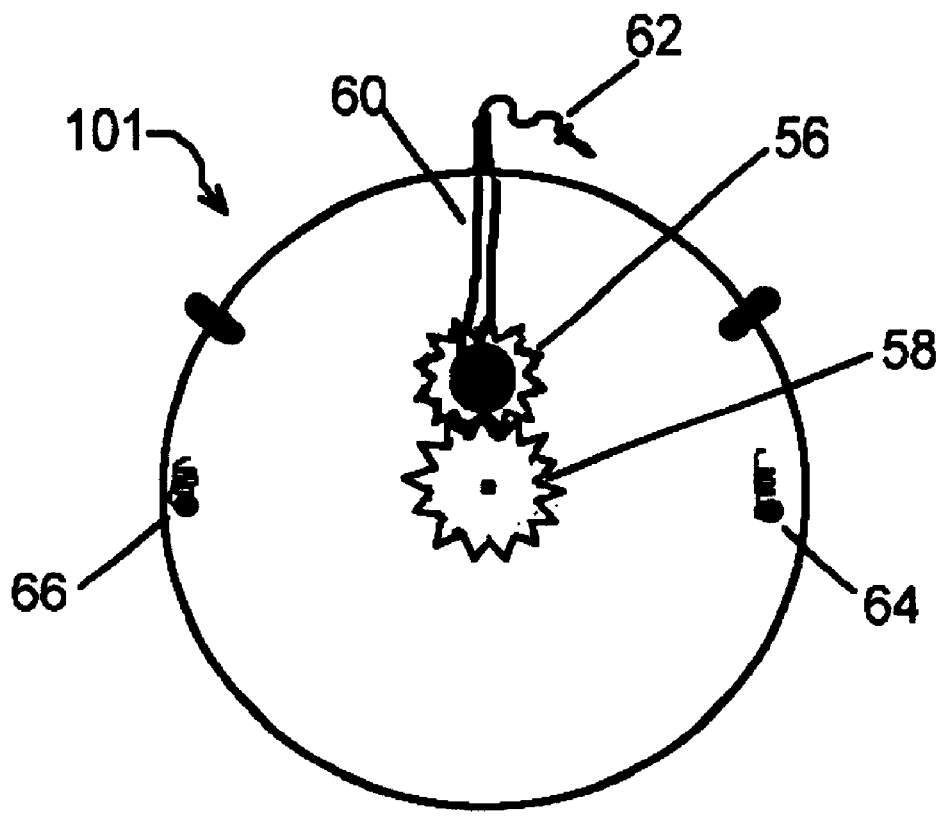
FIG. 8 is a top view of a z-axis mounting structure.
Figure 9:
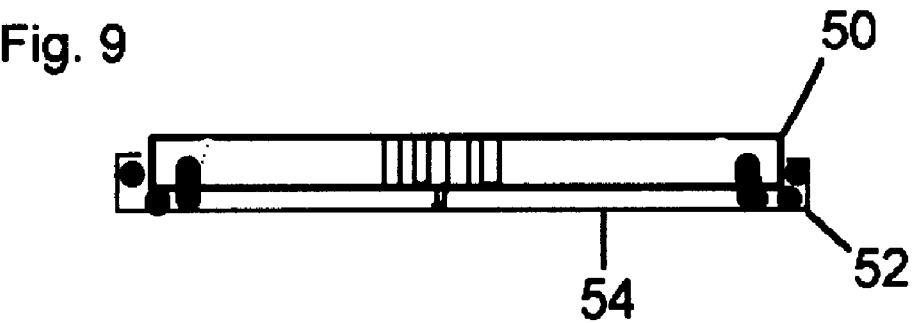
FIG. 9 is a side view of FIG. 8.

Now referring to FIGS. 8 and 9, a secondary platform assembly 101 may also be employed. The secondary platform assembly 101 measures z-axis rotation and can be mounted on top of the primary device 10. This secondary platform assembly 101 consists of two plates. The upper plate 50 is supported by ball bearings 52 located in a groove at the perimeter of the bottom plate 54. This allows smooth rotation of the upper plate 50 about a vertical axis (z-axis). A potentiometer 56 positioned against the pivot gear 58 measures the degree of rotation and relays that information via the output wires 60 and z-axis output jack 62 which plugs into the conversion box. Adjustable, variable-tension springs 64 and 66 are used to restrict the amount of rotation allowed and to adjust the speed and force exerted by the upper plate to return to a neutral position.

Figure 10:
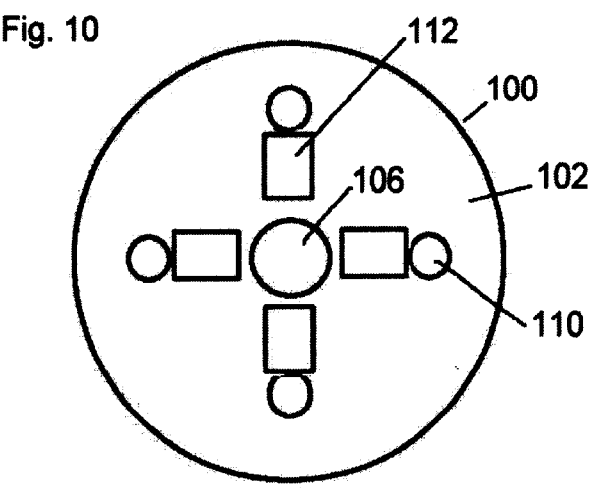
FIG. 10 is pictorial view of an optional tertiary platform.
Figures 11, 12:
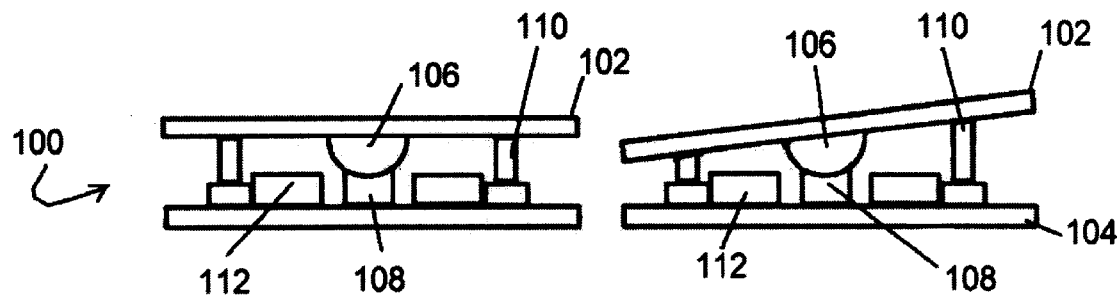
FIG. 11 is a side view of FIG. 10.
FIG. 12 is an alternative view of FIG. 11 depicting the platform at an angular incline.

FIGS. 10–12 illustrate an optional tertiary plate assembly unit 100 that acts as a tactile feedback mechanism, allowing for sensation of force feedback and producing tilting movements. The tertiary unit 100, which may be used in conjunction with the primary unit 10, comprises an upper plate 102 and a lower plate 104 plate. The upper plate 102 is attached to a pivot hemisphere 106 which is supported by a post-elevated acetabulum 108 which keeps the top plate 102 elevated above the base plate 104. This allows free tilting in all directions along the X and Y axis.

A hydraulic piston and/or spring-driven mechanism biases the forceplate 102 to the neutral/flat position. The force required to tilt the plate can be adjusted so that minor weight shifts and involuntary sway does not cause the plate to tilt. The hydraulic system 110 dampens the plate movements so that the subject is not lurched to and fro.

The advanced force feedback machines incorporate motors 112 electronically controlled by software to create sudden movements, bounces and other perturbations. These motors are controlled by cables that link the conversion box via the force feedback port.

FIG. 12 depicts the upper plate 102 at an angular position in relation to lower plate 104. The upper plate 102, being attached to a pivot hemisphere 106, is allowed to move into the angled position with support from the post-elevated acetabulum 108 which keeps the top plate 102 elevated above the base plate 104. In this illustration, hydraulic piston 110 biases the forceplate 102 to the neutral/flat position and dampens the plate movements when tilted or returned to the neutral position.

Figure 13:
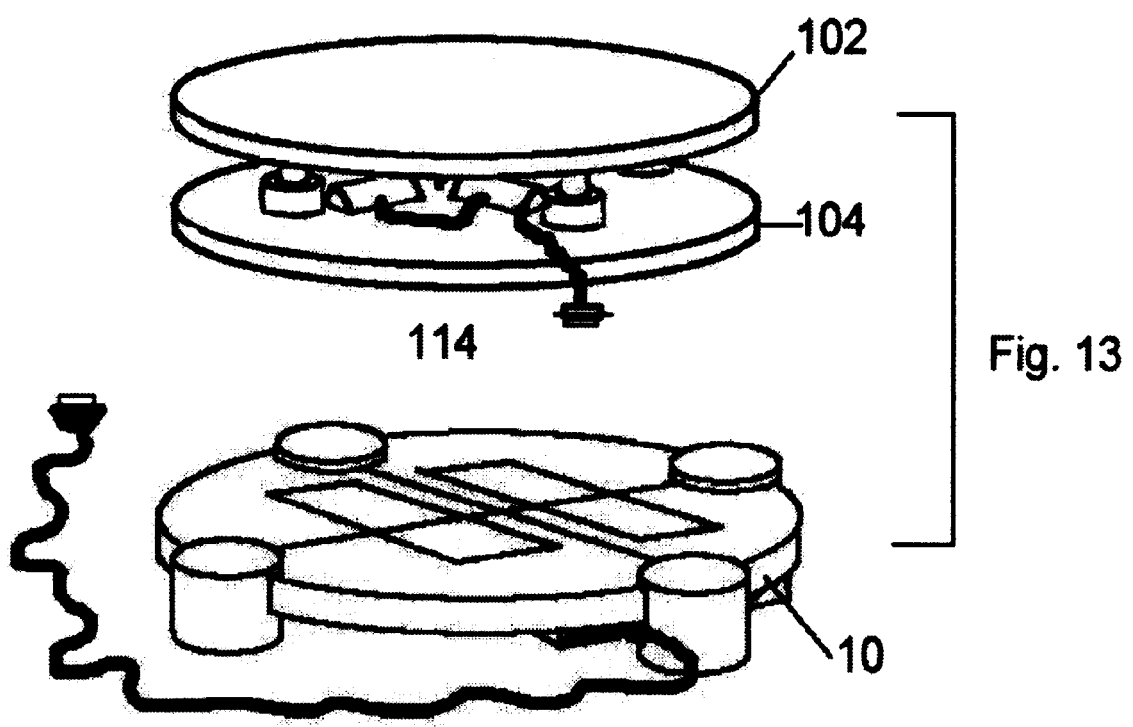
FIG. 13 is an exploded view of the platform with the tertiary platform in position for attachment.
Figure 13A:
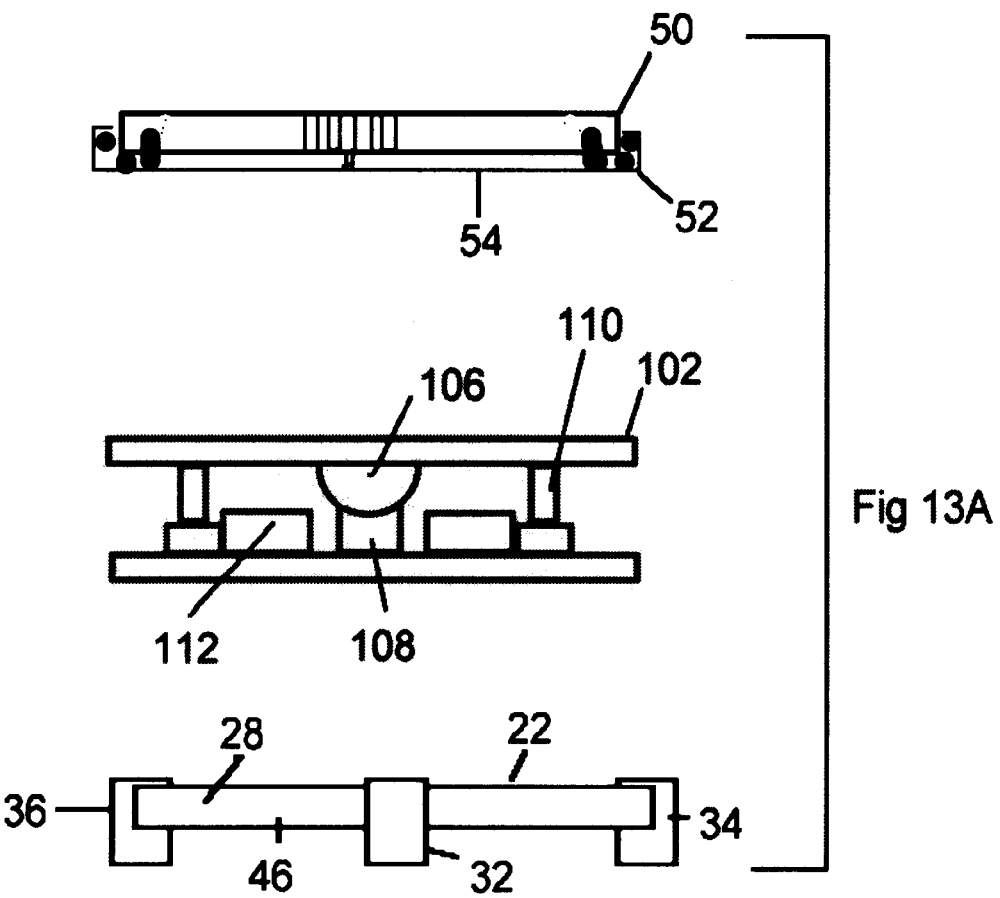
FIG. 13A is an exploded side view of the primary platform, secondary platform assembly, and tertiary plate assembly shown in a stacked arrangement.

In keeping with the objectives of the invention, the primary, secondary, and tertiary units 10,101,100 may be used in different combinations and orientations to simulate a variety of situations. For example, as shown in FIG. 13A, the tertiary unit 100 may be sandwiched between the primary unit 10 and the secondary unit 101, with the secondary unit on top. This arrangement allows simulation of activities like skiing, wherein the tertiary unit top plate 102 may be pitched, for example, to simulate the slope of a downhill ski mountain. Because the axial rotation occurs on the secondary unit 101, which is distinct from the tertiary unit 100, an individual may practice making the body-twisting motions needed by skiers during a ski run. This arrangement also allows an individual to feel the results of pivoting on a sloped surface, such as a mountainside, thereby allowing the individual to practice maintaining his balance on non-level terrain.

Figure 13B:
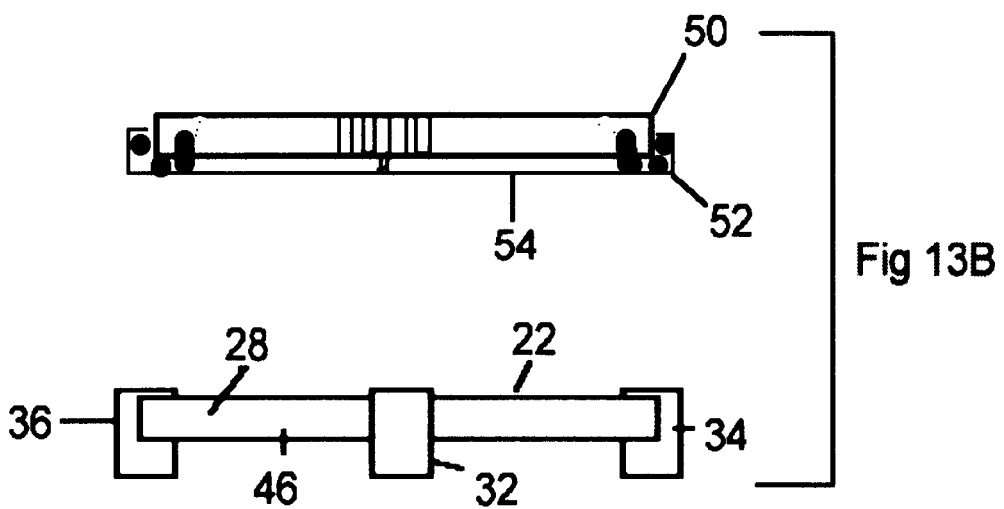
FIG. 13B is an exploded side view of the primary platform and secondary platform assembly shown in a stacked arrangement.

Alternatively, as shown in FIG. 13B, the primary unit 10 may be placed on top of the secondary unit 101. This arrangement is useful for measuring patient lean propensity separate from his tendency to twist. By placing the secondary, rotation-monitoring plate 101 below the primary, weight-distribution-monitoring plate 10, leaning forward registers as forward lean, even if the patient has rotated with respect to the floor. This arrangement allows separate, yet simultaneous, monitoring of patient twisting and absolute patient lean. With this arrangement, patient lean input data is not mixed with patient twist input data.

The plates may also be configured to simulate other activities, such as facing backwards while riding in a vehicle. For example, to simulate riding in the back of a flatbed truck or in the fighting chair of a fishing boat, the tertiary, or force-feedback, unit 100 may be placed at a one-hundred-eighty degree offset from normal with respect to the primary platform 10.

Figure 14:
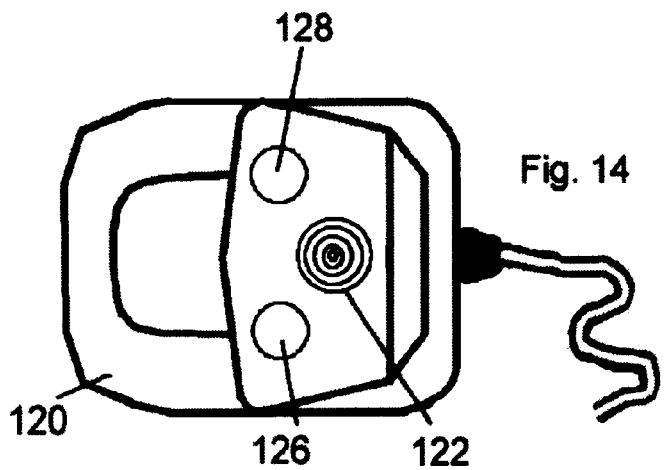
FIG. 14 is a top view of a hand controller adapter.
Figure 15:
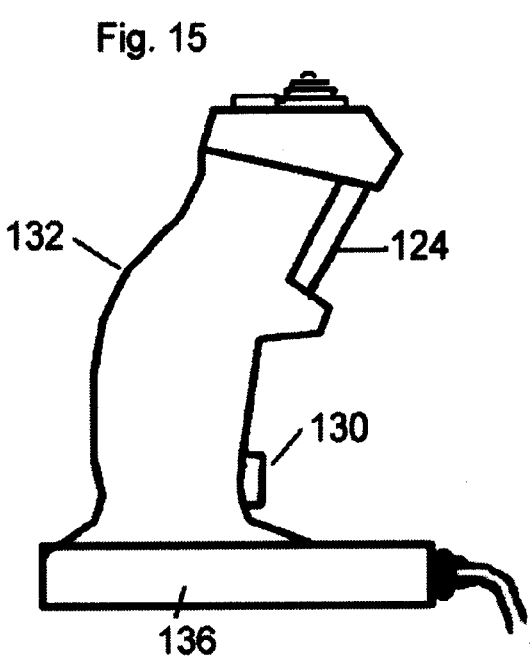
FIG. 15 is a side view of the hand controller adapter shown in FIG. 14.
Figure 16:
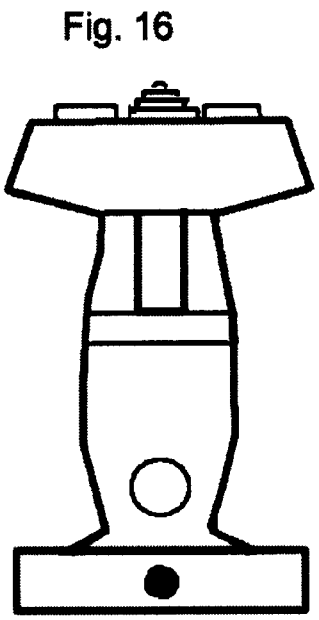
FIG. 16 is an end view of FIG. 15.

FIGS. 14–16 depicts the hand controller adapter which provides an optional secondary plug-in hand-held device 120 that incorporates a multidirectional hat switch 122 and four analog buttons 124, 126, 128, and 130. The hand controller consists of a pistol grip device 132 with four click-on click-off buttons including the trigger button 124. The top surface houses the multidirectional hat switch that ergonomically allows thumb control. The base 136 allows the device to stand when not in use.

Figure 17:
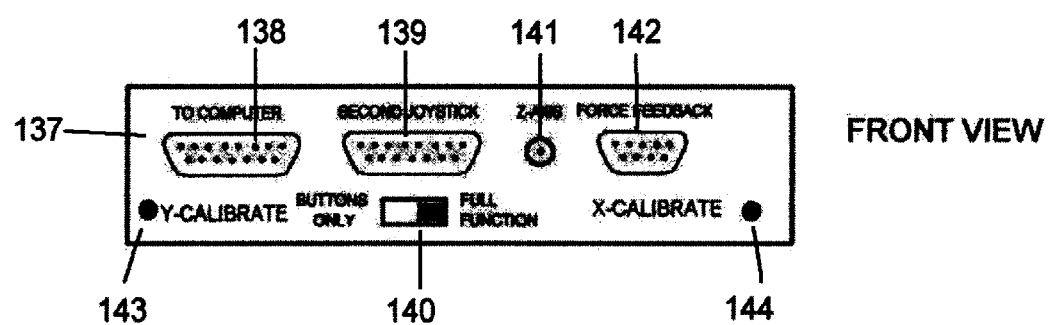
FIG. 17 is a rear view of a controller.

FIG. 17 is a rear output view of the conversion box 137. There is an output port 138 that connects via cable to the computer's joystick port. The secondary joystick port 139 is available for the hand controller 120. A sliding switch 140 allows convenient selection between force-plate versus hand-held unit for X–Y axis control. The Z-axis input jack 141 accepts the Z-axis input cable 62. The force feedback input port 142 accepts the force feedback input cable. Y-axis calibration is accomplished via the Y-calibration knob 143. Likewise, X-axis calibration is accomplished via the X-calibration knob 144.

It is to be understood that while I have illustrated and described certain forms of my invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What I claim is:

1. In combination, a computer having software with derived control functions, a portable computer peripheral device in the form of a floor positioned apparatus for driving a computer cursor in correlation to translation of weight shifts of an individual supported by said apparatus, said apparatus comprising:

a primary platform being sensitive to weight shifts of an individual supported thereby, said primary platform having a plurality of leg supports to maintain said platform assembly a predetermined distance above the floor;

a plurality of strain gauges, with at least one gauge being formed integral with a corresponding one of said leg supports, said strain gauges constructed and arranged to accurately indicate said weight shifts regardless of the location of said individual;

a circuit for monitoring the deflection of each of said strain gauges, said circuit calculating the amount of deflection within each of said strain gauges simultaneously and converting the amount of deflection into an analog signal; and an interface means for coupling said circuit to said computer;

wherein one of said strain gauges is secured to each leg support, each said strain gauge measuring a shift in weight applied to a corresponding leg, and wherein said apparatus allows for the control of certain functions of the computer using an individual's control of his center of gravity while supporting his weight upon said platform, and whereby said strain gauges consistently measure weight shifts without regard to the location of said individual;

further including a secondary platform assembly having a means for detecting z-axis rotation of said secondary platform assembly, said primary platform being adjustably positionable with respect to said secondary platform assembly such that output from said apparatus is selected from a group consisting essentially of z-axis rotation information registered by said secondary platform and weight shift information registered by said primary platform.

2. The combination of claim 1, wherein said primary platform is adapted to support a wheelchair.

3. The combination of claim 1, wherein said primary platform includes at least one ski binding for the selective attachment of at least one corresponding ski boot.

4. The combination of claim 1, wherein said primary platform includes at least one snowboard binding.

5. The combination of claim 1, wherein said primary platform is adapted to support a person in a sitting orientation.

6. The combination of claim 1, wherein said platform is adapted to support a person in a substantially-horizontal orientation.

7. The combination of claim 1, wherein said output from said apparatus indicates weight shift information and z-axis rotation independently.

8. The combination of claim 1, wherein said output from said apparatus indicates weight shift information as a function of z-axis rotation.

9. The combination of claim 1, including at least one hardware interface port adapted to accept an auxiliary input member.

10. In combination, a computer having software with derived control functions, a portable computer peripheral device in the form of a floor positioned apparatus for driving a computer cursor in correlation to translation of weight shifts of an individual supported by said apparatus, said apparatus comprising:

a primary platform being sensitive to weight shifts of an individual supported thereby, said primary platform having a plurality of leg supports to maintain said platform assembly a predetermined distance above the floor;

a plurality of strain gauges, with at least one gauge being formed integral with a corresponding one of said leg supports, said strain gauges constructed and arranged to accurately indicate said weight shifts regardless of the location of said individual;

a circuit for monitoring the deflection of each of said strain gauges, said circuit calculating the amount of deflection within each of said strain gauges simultaneously and converting the amount of deflection into an analog signal; and an interface means for coupling said circuit to said computer;

wherein one of said strain gauges is secured to each leg support, each said strain gauge measuring a shift in weight applied to a corresponding leg, and wherein said apparatus allows for the control of certain functions of the computer using an individual's control of his own center of gravity while supporting his weight upon said platform, and whereby said strain gauges consistently measure weight shifts without regard to the location of said individual including a removable tactile feedback mechanism operatively associated with said primary platform, said tactile feedback mechanism including a tactile output means for producing tilting movements and force-feedback perturbations, as guided by a software application, whereby relevant physical cues are communicated to a user, said force-feedback mechanism being selectively orientable with respect to said primary platform, whereby the relevance of said tilting movements and said force-feedback perturbations may be adjusted to simulate a plurality of environments.

11. The combination of claim 10, further including a secondary platform assembly having a means for detecting z-axis rotation of said secondary platform assembly, said primary platform being adjustably positionable with respect to said secondary platform assembly such that output from said apparatus is selected from a group consisting essentially of z-axis rotation information registered by said secondary platform and weight shift information registered by said primary platform.

12. The combination of claim 11, wherein said primary platform is adapted to support a wheelchair.

13. The combination of claim 11, wherein said primary platform includes at least one ski binding for the selective attachment of a at least one corresponding ski boot.

14. The combination of claim 11, wherein said primary platform includes at least one snowboard binding.

15. The combination of claim 11, wherein said primary platform is adapted to support a sitting orientation.

16. The combination of claim 11, wherein said platform is adapted to support a substantially-horizontal orientation.

17. The combination of claim 11, wherein said output from said apparatus indicates weight shift information and z-axis rotation independently.

18. The combination of claim 11, wherein said output from said apparatus indicates weight shift information as a function of z-axis rotation.

19. The combination of claim 11, including at least one hardware interface port adapted to accept an auxiliary input member.

* * * * *